United States Patent [19]

Root

[11] 4,011,035
[45] Mar. 8, 1977

[54] APPARATUS FOR MOLDING CHARACTERS ON A BLANK

[75] Inventor: Russell L. Root, Cleveland, Ohio

[73] Assignee: Addressograph Multigraph Corporation, Cleveland, Ohio

[22] Filed: Mar. 12, 1973

[21] Appl. No.: 340,174

[52] U.S. Cl. .............................. 425/121; 425/125; 425/129 R; 425/245 R; 425/289; 264/251; 264/260

[51] Int. Cl.² .......................................... B29C 27/00

[58] Field of Search .......... 425/121, 125, 129, 127, 425/246, 122; 264/251, 243, 260; 101/110

[56] References Cited

UNITED STATES PATENTS

| | | | |
|---|---|---|---|
| 2,298,365 | 10/1942 | Gits et al. ...................... | 264/328 X |
| 3,196,490 | 7/1965 | Erb ................................ | 425/129 |
| 3,354,249 | 11/1967 | Morin ........................... | 425/129 X |
| 3,485,164 | 12/1969 | Bossi ............................ | 101/110 |
| 3,553,787 | 1/1971 | Ballard et al. .................. | 425/129 |

*Primary Examiner*—Robert L. Spicer, Jr.

[57] ABSTRACT

An improved apparatus and method is provided for molding a plurality of plastic characters on the upper surface of a plastic blank having a passage at each location where a character is to be molded. Rotatable die wheels having character defining recesses or cavities are disposed at a molding station above a support for the blank. These die wheels are rotated relative to each other to align cavities defining selected characters directly above the passages in the blank. The aligned die wheels are then moved into abutting engagement with the upper surface of the blank with the passages in the blank communicating with the cavities of the wheels which define the selected characters. Plastic material is then forced through the passages in the blank and into the cavities to simultaneously mold the selected characters on the upper surface of the blank.

8 Claims, 9 Drawing Figures

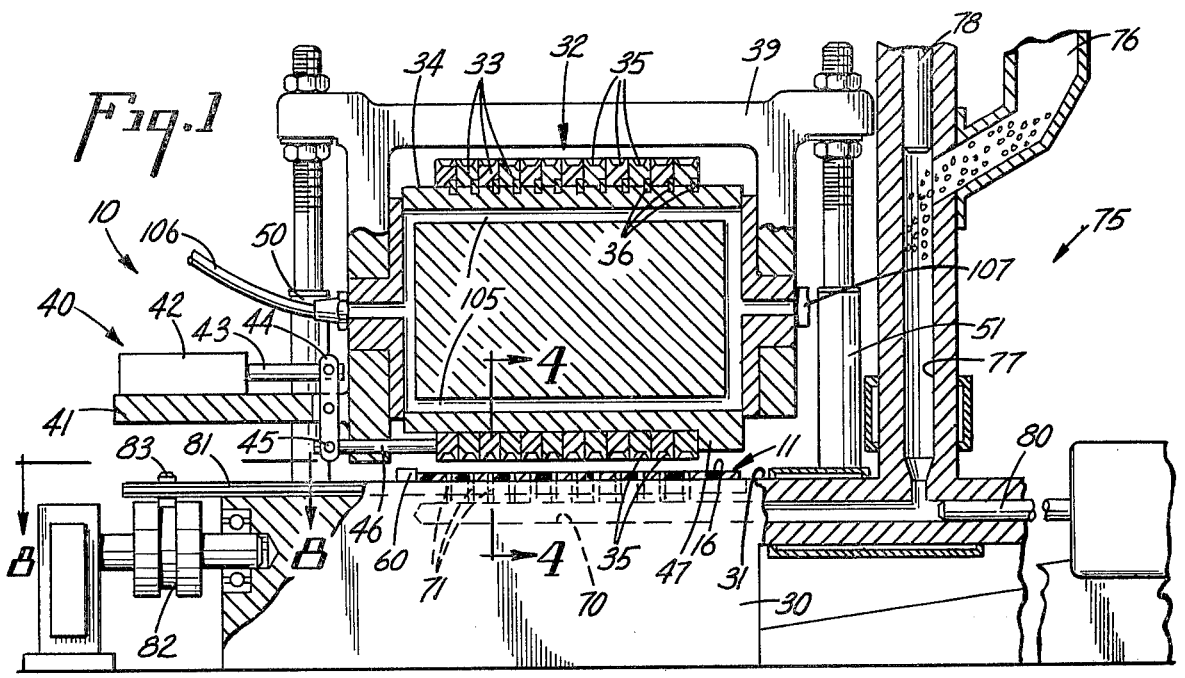

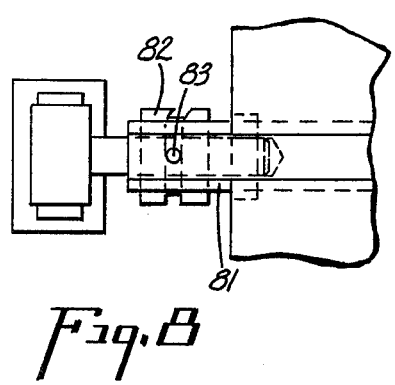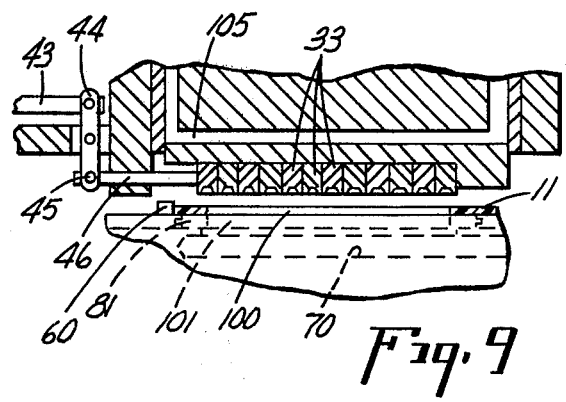

4,011,035

APPARATUS FOR MOLDING CHARACTERS ON A BLANK

BACKGROUND OF THE INVENTION

The present invention relates to a method and an apparatus for molding and, in particular, relates to a method and an apparatus for molding a plurality of plastic characters on the surface of a card stock blank to thereby form a printing card or the like.

The common way in which printing token cards are presently made is by an embosing process. Typically, such cards are made from plastic base sheets and embossed with characters, such as letters and/or numbers. The embossing process results in raising the characters from the blank so that the characters on the card act as type when a printing roller or the like is passed over a card. The embossing process, of course, results in hollow characters being formed and pressure which is applied to the characters during printing causes repeated deflection and stressing thereof. As a result, the characters sometimes become deformed or distorted, and the cards sometimes lose their ability to produce quality printing.

In order to solve the above problems with the embossed credit cards, it has been suggested that molded plastic characters be formed on a blank. Such characters would not be hollow, but rather would be solid, and would not, therefore, be subject to the same degree of deformation and stressing as embossed characters.

Various techniques for molding the plastic characters on a blank to form a credit card have been suggested. Ballard et al. U.S. Pat. No. 3,553,787 is an example thereof. The known techniques have not been completely satisfactory and are subject to certain practical problems, the greatest of which is sprue detaching and surface smoothing. These problems center around the handling of the flowable plastic material which is to form the characters. Typically, the equipment for forming the characters includes a plurality of die wheels having die cavities therein and which are rotated in order to position a given cavity defining a selected character in position for molding. The manner in which the plastic material has been delivered to the die cavities is also a potential source of problems since the plastic material is passed through a passage defined by aligned openings in the die wheels which is subject to clogging and which tends to impair individual wheel operation during setting, and each individual cavity is provided with a gate which gives rise to a sprue when the character is unmolded.

SUMMARY OF THE PRESENT INVENTION

The present invention is directed to a method and an apparatus for molding characters on a blank to form a credit card or the like. The method and apparatus of the present invention is such that the molding of the characters is accomplished with a minimum of problems in the handling of the plastic material.

The apparatus embodying the present invention includes a plurality of die wheels having die cavities which completely define the final forms of the characters to be molded on the upper surface of a plastic blank, since they are free of gates which would leave sprues on the printing parts of the molded characters. The wheels are rotatable in order to locate a particular cavity in position against the surface of the blank for forming a desired character on the blank. The plastic material is delivered to the cavities in the die wheels through openings in the blank. In addition, a clamping mechanism is utilized to clamp the die wheels together, thereby minimizing the probability of flow of any plastic material into the area or space between wheels, thereby further reducing the possibility of clogging or sticking of one wheel to another and thereby enabling the die wheels to be rapidly positioned for purposes of selecting the desired character to be molded. Accordingly, the plastic material is isolated from the die wheels until it enters the die cavities, and this is its entire contact with the wheels. This arrangement minimizes the possibility of clogging of the die wheels and enables the wheels to be rapidly positioned as desired. Moreover the full printing face of each character is formed entirely by contact with the interior of the gate-free wheel cavity, and is hence free of the possibility of marks or irregularities which might result from sprue detachment. In addition, of course, the operation of sprue detachment is made unnecessary, since the only sprue which is formed is a part of the welding attachment of the character to the plastic blank.

The speed of operation of the apparatus of the present invention is enhanced thereby due to the fact that the plastic material which forms the characters is delivered into the mold cavities in the die wheels through a passageway formed in the blank which serves as the gating agent for the mold cavity, as opposed to passageways formed in the wheels themselves. As a result, the plastic material does not flow through the wheels to the die cavities and does not have to pass from wheel to wheel, traversing the wheel interfaces. This provides an arrangement whereby the mold surfaces may be maintained continuously at a low enough temperature to have a pronounced cooling and setting effect upon the plastic. Therefore, the molds can be separated instantly after injection leaving a character whose surface is sufficiently set to maintain its dimensions and configuration. More especially, the mold temperatures no longer require maintenance within a sharply critical range dictated by the opposing specifications of sufficient heat to keep plastic flow through the wheels from impacting, while still getting the cast characters promptly set so that the molds can be opened to start a new cycle.

DESCRIPTION OF THE FIGURES

Further features of the present invention will be apparent to those skilled in the art to which it relates from the detailed description of the preferred embodiment of the present invention which is made with reference to the following figures wherein:

FIG. 1 is a somewhat schematic sectional view of an apparatus embodying the present invention and used for making credit cards or the like;

FIG. 2 is a sectional view of a credit card blank used in the apparatus of FIG. 1;

FIG. 3 is a sectional view of a credit card made by the apparatus of FIG. 1 utilizing the blank of FIG. 2;

FIG. 4 is a view drawn to a larger scale of the apparatus of FIG. 1, taken approximately along the line 4—4 of FIG. 1;

FIG. 5 is a view similar to FIG. 4, but showing the parts in a different position;

FIG. 6 is a view of the apparatus of FIG. 4, looking at the apparatus of FIG. 4 along line 6—6 thereof;

FIG. 7 is a view of the apparatus as shown in FIG. 6, taken approximately along the line 7—7 thereof;

FIG. 8 is a view of the apparatus of FIG. 1, taken approximately along the line 8—8 of FIG. 1; and FIG. 9 is a fragmentary sectional view of a modified apparatus embodying the present invention.

DESCRIPTION OF THE PREFERRED EMBODIMENTS

The present invention relates to a method and an apparatus for forming printing tokens, such as credit cards. The present invention is preferably embodied, as illustrated in FIG. 1, in a molding apparatus 10. The molding apparatus 10 is used in the formation of letters and numbers on a base sheet or blank 11 (see FIG. 2) to form a printing token such as a credit card, designated 12, (see FIG. 3) having molded characters 13 and 14 thereon. The blank 11 includes a plurality of openings 20 therein which extend through the card from the undersurface 17 thereof to the upper surface 16.

The apparatus 10 is used for molding characters on the upper surface 16 of the blank 11 and includes a support portion 30 having a support surface 31 on which the blank 11 is carried. The apparatus 10 also includes a die means, generally designated 32, which is located above the support surface 31.

The die means 32 comprises a series of die wheels 33 which are mounted side-by-side for rotation on a cylindrical support member 34. Member 34 may be either stationary or rotatable. The support member 34 preferably has passages 105 through which a coolant may be introduced via conduits 106 and 107 to keep the die wheels cool enough to cause injected material to solidify promptly. Each of the die wheels 33 has a plurality of outwardly opening cavities 35 positioned around its periphery. Each cavity defines a different character which it is desired to form on the upper surface 16 of the blank 11. The various die wheels are rotated in order to properly align them with each other to form the arrangement of characters to be formed, and specifically to position the cavities which are to form the selected characters in axial alignment with each other and in vertical alignment with the openings in the blank 11.

Any one of a variety of mechanisms may be provided for rotating the wheels 33 individually and selectively to the desired position so that the proper relationship of the characters may be provided on the blank 11. A specific mechanism for setting the die wheels, which may be utilized in the present organization, is disclosed in Ballard et al. U.S. Pat. No. 3,553,787 and that disclosure is incorporated herein by reference. The clutch mechanisms 36, shown schematically in FIG. 1, form one portion of this wheel setting mechanism, and correspond to the dogs 162 of U.S. Pat. No. 3,553,787 provided between a rotatable cylindrical member and the die wheels. By selectively operating the die wheel setting mechanisms of U.S. Pat. No. 3,553,787, different wheels 33 can be selectively rotated to the desired position relative to each other. Preferably the die wheel setting will be under suitable automatic control, e.g. tape reading mechanism. Alternatively, of course, the members 36 may be regarded as detents for cooperation with a series of suitable locating notches in each corresponding die wheel, the latter being mounted on a fixed cylinder 34, and each wheel could then be set by a manually held stylus if desired. In any case, the appropriate cavity in each die wheel in positioned in facing relationship with the upper surface 16 of the blank 11. Further description of this mechanism is omitted in view of the fact that it is known structure and does not form a part of the present invention.

Once all of the wheels 33 have been properly positioned in aligned relation for purposes of forming a line of characters on the blank, a clamping mechanism, generally designated 40, may be operated. The clamp mechanism 40 is supported on a frame portion 41 of the apparatus 10 and includes a suitable fluid motor 42 having a reciprocable piston rod 43. The piston rod 43 is connected at one end with a suitable pivoted link 44 which in turn is connected at its other end 45 to a reciprocating pin or clamp member 46. The clamp member 46 engages the leftmost wheel 33 and applies an axial clamping force thereagainst, which force in turn is transmitted through all of the wheels 33, clamping the wheels 33 against a shoulder portion 47 located on the right end of the drum 34, as viewed in FIG. 1. The clamp mechanism 40, as noted above, is energized after the die wheels 33 have been properly rotated and positioned with respect to each other and prior to the actual molding operation. It should be noted, however, that the clamping mechanism 40 will provide a force on the die wheels 33 holding the die wheels 33 in the positions to which they have been actuated and also clamping the wheels 33 axially together in sealing contact to thereby minimize the opportunity for flow of plastic material into the space or area between adjacent die wheels 33. The purpose of the clamping mechanism is discussed in detail hereinafter in relation to various forms of the invention.

Once the die wheels 33 have been properly positioned in molding position with the various cavities 35 therein aligned as desired, the die wheels 33 are bodily moved downwardly into abutting engagement with the upper surface 16 of the blank 11. This movement is accomplished by a pair of fluid cylinders 50 and 51 which are located on opposite sides of the die means 32 and which are connected with the frame 39 of the apparatus 10, which frame supports the die wheels 33 and the rotatable drum 34. Actuation of the fluid cylinders 50 and 51 causes downward movement of the die wheels 33 as a unit into abutting engagement with the upper surface 16 of the blank 11, as shown in FIG. 5. In fact, the area of the wheels 33 surrounding the die cavities therein seal against the upper surface 16 of the blank 11. The downward force applied against the blank 11 also seals the undersurface 17 of the blank 11 against the surface 31 of the support 30. These seals minimize the possibility of plastic material being forced outwardly between the undersurface 17 of the blank 11 and the surface 31 of the support, and/or between the upper surface 16 of the blank 11 and the surface of the die wheels 33.

The blank 11 is constructed so that at least one opening 20 therein communicates with each cavity 35 when the die wheels 33 are positioned thereagainst, as shown in FIG. 5. In order to effect this positioning or this relationship, the blank 11, when positioned on the upper surface 31 of the support 30, must be aligned properly so that when the cylinders 50 and 51 are energized, moving the die wheels 33 downwardly, an opening 20 will communicate with each cavity. A suitable aligning mechanism in the form of stop means, generally designated 60, is illustrated in FIG. 1. That aligning mechanism 60 merely comprises stops against which the blank 11 is positioned. It should be clear that the positioning of the blank 11 on the support is important and that the stops 60 may be adjustable for the handling of different types and sizes of blanks 11. While only one stop element is shown in the drawing, it will be apparent that the stop means 60 must align the blank 11 in two directions in order to ensure that the openings 20 are properly located relative to the cavities 35.

After the die wheels 33 are moved downwardly and into abutting engagement with the upper surface 16 of the blank 11, the heated fluent plastic material which is to be molded and formed into the particular characters is forced or expressed into the cavities formed in the die wheels 33. In accordance with the present invention, the plastic material is directed into the cavities 35 through the support 30 and openings 20 in the blank 11. As shown in FIG. 1, the support 30 has a main passageway 70 therein which communicates with a plurality of branch passageways 71. The branch passageways 71 are axially aligned with the openings 20 in the blank 11, and the mold cavities 35 in the wheels 33.

A suitable means is provided, generally designated 75, for directing the plastic material through the passageways 70, 71 and through the openings 20 in the blank 11 and into the cavities 35 of the die wheels 33. The means 75 includes a hopper mechanism 76 which delivers plastic material into a vertically disposed bore 77. A plunger member 78 moves in the bore and moves the plastic material downwardly therein and into the horizontal passageway 70. Another plunger member 80 moves into the passageway 70 and upon movement thereof forces the plastic material that has been delivered into the passageway 70 through the branch passageways 71 in the support 30 and through the openings 20 in the blank and into the cavities 35 in the die wheels 33. It should be apparent that the flow of the plastic material is through the various openings in the blank 11.

As is customary, the plastic material is maintained sufficiently hot to be fluent under pressure by suitable heating means (not shown) applied to the members through which it passes on the way to the mold. In passing through the openings 20 in the blank 11, the heat of the plastic material softens the adjacent material of the blank and forms a welded connection therewith. At the same time the cooling effect of the cavity walls induced by the coolant in passages 105 initiates setting of the plastic so that the dies can be opened almost instantly once the filling is complete.

Located in the support 30 and defining a portion of the surface 31 of the support 30 on which the blank 11 is positioned is a valve member 81 which is slidable in the support 30, and activatable by a cam arrangement 82. The slidable valve member 81 has openings therein which form a part of the passages 71 and which align with the openings 20 in the blank 11 when the valve member 81 is in its open position for molding. The cam 82 cooperates with a follower 83 on the outer end of the valve member 82 and the cam 82 is configured so as to operate in timed relation with the other parts of the apparatus 10 so that after the plunger 80 has delivered the plastic material into the cavities 35, the valve member 81 is reciprocated thereby to sever the material in the branch passages 71 from the blank 11 and to block the flow of further material from the bore 77 into the cavities 35 in the die wheels 33. This blocking action prevents an excess amount of plastic material being delivered into the cavities 35 and minimizes the possibility of plastic material being forced out of the cavities 35 between the die wheels 33 and the upper surface 16 of the blank 11.

As noted hereinabove, the cavities 35 are shaped to the desired character or number which is to be formed on the blank 11. The cavity 35 shown in FIGS. 6 and 7 defines the character "O". As there illustrated, the opening 20 in the blank 11 aligns with a pocket 90 in the die wheel 33, located centrally of the O forming cavity. The pocket 90 has leader grooves or passageways 91 extending therefrom so as to communicate with the outer portion 92 of the cavity in the die wheel. As shown in FIG. 6, the outer portion 92 is of a depth greater than the pocket 90 and leader grooves 91. Accordingly, the O character which is formed when the plastic material is molded projects above the ribs formed by the passages 91 to a level where it will be capable of forming a printing impression. Character 13, shown in FIG. 3, is an O and, as shown, the portion 92a of the character, resulting from the cavity portion 92, is located higher than the ribs 91a extending from the central portion 90a of the character to the main portion 92a of the O character, so that the character impression will include an imprint of the portion 92a, and the portions 90a and 91a will not print.

For other characters, such as a "T" or an "I", passages like 91 in the die wheel cavity are not necessary in view of the fact that the openings 20 in the blank 11 will communicate directly with a main part of the character. Character 14 is of such a type, and the character has a portion 95 projecting into the opening 20 of the blank 11 with which it is associated.

By the arrangements immediately above described it is possible to position the openings 20 in the blanks 11 in accordance with a standard spacing plan and still have them operate to fill the cavity for any character which may be presented.

It should be apparent from the above that the final card which is formed by the present apparatus is formed with molded characters such as 13 and 14 thereon. The cross section through the final credit card which is manufactured is shown in FIG. 3. Only two characters are shown in FIG. 3, they being represented by the reference numerals 13 and 14, 13 being an O and 14 being an I, for example. As shown, the character 13 is molded on the upper surface 16 of the blank and the main portion 92a thereof projects upwardly above the rib portions 91a. Also, it should be apparent that each character has a portion 90a or 95 which projects into the opening 20 in the blank 11, all of which results in the character 13 being well secured to the blank 11 by a welding action during character formation.

A modification of the present invention, which is illustrated in FIG. 9, is similar in all respects to that described above in connection with FIG. 1, with the exception that the blank 11, instead of being provided with individual openings 20 therein, is provided with a slot 100. Likewise, the valve member 81 is provided with a corresponding slot 101. In this instance the valve member 81 is movable sideways rather than lengthwise of the slot to block the flow of plastic to the blank 11 in the manner previously explained.

It will be noted that because of the continuous nature of the slot 100, softened plastic material will be presented to the interface surfaces of the wheels 33, and if there is any slack between them, some plastic may be forced into the interstices. In this form of the invention, therefore, the use of the clamping mechanism 40 is recommended so that such invasion of the plastic material can be forestalled.

In the previously described form of the invention, while the use of the clamping mechanism 40 is altogether feasible, it can be appreciated that its presence is not wholly essential, since access of plastic to the wheel interstices is normally effectively prevented by the seal at the perimeter of each character cavity.

As an alternative consideration, it may also be noted that the clamping mechanism 40 could successfully be applied to an arrangement wherein the softened plastic is introduced to the cavities through wheel traversing passages (such as that shown in U.S. Pat. No. 3,553,787) to discourage invasion of plastic between the wheels and thus contribute significantly to the practical effectiveness of a system of that character.

From the above, it should be apparent that applicant has provided an improvement in the art of molding characters on a base sheet. The apparatus does isolate the flow of molten plastic material into the cavities, and obviates the requirement that the stream of plastic be conducted through passages in the wheels themselves, and this separation, from the body of the die wheels, of the flow of the softened plastic material into the cavities improves the efficiency of the mechanism and minimizes the possibility of fouling of the die wheels 33 or clogging of the wheels by reason of the plastic materials's becoming lodged between the wheels 33, and perhaps becoming wholly or partially congealed.

While a particular embodiment of the invention has been described in detail, it will be understood that additions, eliminations and modifications may be made without departing from the ambit of the invention as defined in the subjoined claims.

I claim:

1. Apparatus for molding a plurality of plastic characters on the face of a plastic blank having passage means extending therethrough, said apparatus comprising:
    support means engageable with the reverse surface of the blank for supporting the blank in molding position,
    die means having gate-free cavities corresponding to the shape of the characters to be molded, said die means comprising a plurality of die members in side-by-side relation, each having a plurality of said cavities therein,
    means supporting said die members for movement relative to each other so that a plurality of cavities defining selected characters can be aligned adjacent the passage means in the blank,
    means for effecting relative movement of said plurality of die members and said blank to position an area on the die members surrounding said aligned cavities in abutting engagement with the face of said blank,
    means for forcing plastic material first through the passage means in said blank and thence into said aligned die cavities after said die members and the face of the blank have been positioned in abutting engagement to simultaneously mold the characters defined by said aligned cavities in adhering relationship to the face of said blank, said means including passageways in said support means communicating with said passage means in said blank, and
    said support means including as a portion thereof a valve member providing a surface on which the reverse surface of the blank rests, and means for moving said valve member to sever material in the passageways from said blank.

2. Apparatus as defined in claim 1 wherein said means for effecting relative movement of said plurality of die members and said blank comprises means for bodily moving said die members into engagement with said blank to provide a sealing engagement between the face of said blank and die wheels and to provide a sealing engagement between the reverse surface of said blank and said valve member.

3. Apparatus as defined in claim 1 wherein the die members are spaced on equal centers, the passage means in said blank comprises a plurality of equally spaced individual passages extending from the reverse of the blank to the face of the blank in line with the die members, and wherein said valve member includes a plurality of equally spaced passages which form part of said support member passageways and are aligned with the passages in said blank and with said die members when said blank and said die wheels are in abutting engagement and the valve is in open position.

4. Apparatus as defined in claim 1 wherein said passage means in said blank comprises a slot in said blank which communicates with a plurality of cavities in said die wheels and said valve member includes a mating slot therein through which the plastic material is forced and which aligns with the slot in said blank when the die members and blank are in abutting engagement and the valve is in open position.

5. Apparatus as defined in claim 4 further including clamping means for maintaining a tight side-to-side sealing engagement between said die members to prevent a flow of plastic material between said die members as the plastic material is forced into said die cavities.

6. Apparatus for molding a plurality of plastic characters on the face of a plastic blank having passage means extending therethrough, from the reverse surface to the face, said apparatus comprising:
    support means engageable with the reverse surface of the blank for supporting the blank in molding position;
    die means having cavities corresponding to the shape of the characters to be molded, said die means comprising a plurality of die wheels, in side-by-side relationship, each having a plurality of said cavities therein, and means supporting said die wheels for rotation relative to each other to permit rotating said die wheels about their own axes to align cavities corresponding to selected characters with each other;
    means effecting relative movement of said die means and said support means to provide an abutting engagement between the area of said die wheels surrounding the aligned cavities and the face of said blank;
    means for flowing plastic material through said support means and through the passage means in said blank into said selected die cavities after the die wheels have been positioned in abutting engagement with the face of said blank to simultaneously mold the characters defined by said cavities in adhering relationship to the face of said blank,
    said support means including a valve member providing a surface on which the reverse surface of the blank rests, and said means for moving said plurality of die wheels provides a sealing engagement between the face of the blank and the die wheels as well as a sealing engagement between the reverse surface of the blank and the valve member, and further including means for moving the valve member to either permit or block the flow of material through the passage means in the blank in timed relation to the operation of the means for expressing the plastic material.

7. Apparatus as defined in claim 6 further including means for aligning said blank on said valve member prior to movement of the die wheels into abutting engagement with the upper lamination so as to provide for alignment of the passage means in the blank with the die cavities.

8. Apparatus for molding a plurality of plastic characters on the face of a plastic blank having passage means extending therethrough, said apparatus comprising:

support means engageable with the reverse surface of the blank for supporting the blank in molding position, die means having gate-free cavities corresponding to the shape of the characters to be molded, said die means comprising a plurality of die members in side-by-side relation, each having a plurality of said cavities therein, means supporting said die members for movement relative to each other so that a plurality of cavities defining selected characters can be aligned adjacent the passage means in the blank, means for effecting relative movement of said plurality of die members and said blank to position an area on the die members surrounding said aligned cavities in abutting engagement with the face of said blank, means for forcing plastic material first through the passage means in said blank and thence into said aligned die cavities after said die members and the face of the blank have been positioned in abutting engagement to simultaneously mold the characters defined by said aligned cavities in adhering relationship to the face of said blank, said means including passageways in said support means communicating with said passage means in said blank, a member movable relative to said blank and supported by said support means, and means for moving said member to sever material in said passageways from said blank.

* * * * *